United States Patent [19]

Litchford et al.

[11] Patent Number: 4,768,036

[45] Date of Patent: Aug. 30, 1988

[54] COLLISION AVOIDANCE SYSTEM

[75] Inventors: George B. Litchford, Northport; Burton L. Hulland, Glenwood Landing, both of N.Y.

[73] Assignee: Litchstreet Co., Northport, N.Y.

[21] Appl. No.: 117,547

[22] Filed: Nov. 6, 1987

Related U.S. Application Data

[63] Continuation of Ser. No. 787,977, Oct. 16, 1985, abandoned.

[51] Int. Cl.[4] .......................... G01S 3/02; G08G 7/02
[52] U.S. Cl. ...................................... 342/455; 342/29; 342/32; 364/461
[58] Field of Search ...................... 342/455, 29, 30, 32, 342/41, 46; 364/461

[56] References Cited

U.S. PATENT DOCUMENTS

| Re. 29,260 | 6/1977 | Litchford . | |
|---|---|---|---|
| 3,866,163 | 2/1975 | Litchford . | |
| 3,875,570 | 4/1975 | Litchford | 342/32 |
| 3,895,382 | 7/1975 | Litchford | 342/32 |
| 3,921,172 | 11/1975 | Litchford . | |
| 3,959,793 | 5/1976 | Litchford . | |
| 4,021,802 | 5/1977 | Litchford | 342/32 |
| 4,027,307 | 5/1977 | Litchford | 342/32 |
| 4,115,771 | 9/1978 | Litchford . | |
| 4,161,729 | 7/1979 | Scheider | 342/32 |
| 4,167,006 | 9/1979 | Funatsu et al. | 342/455 X |
| 4,191,958 | 3/1980 | Hulland et al. . | |
| 4,196,434 | 4/1980 | Funatsu et al. | 342/455 X |
| 4,197,538 | 4/1980 | Stocker | 342/32 |
| 4,442,430 | 4/1984 | Schneider | 342/45 |
| 4,486,755 | 12/1984 | Hulland et al. | 342/455 X |
| 4,642,648 | 2/1987 | Hulland et al. | 342/455 |
| 4,688,046 | 8/1987 | Schwab | 342/456 |

Primary Examiner—Theodore M. Blum
Assistant Examiner—John B. Sotomayor
Attorney, Agent, or Firm—Henry S. Huff

[57] ABSTRACT

A position-finding collision avoidance system (CAS) at an Own station within the service areas of at least two identified SSRs at known locations derives differential azimuth (A), differential time of arrival (T), identity and altitude data regarding one or more transponder-equipped Other station from standard ATCRBS interrogations and replies. These data are used to compute the positions of Own and Other stations for display at the Own station.

14 Claims, 2 Drawing Sheets

COLLISION AVOIDANCE SYSTEM

This application is a continuation of application Ser. No. 787,977, filed on Oct. 16, 1985 now abandoned.

BACKGROUND OF THE INVENTION

This invention relates to collision avoidance systems for vehicles such as aircraft, using the standard Aircraft Traffic Control Radar Beacon System (ATCRBS) signals to determine, at an Own station, the positions of Own and any Other transponder-equipped stations within the common areas of two or more secondary surveillance radar (SSR) stations.

Many collision avoidance systems using the ATCRBS signals have been devised or proposed. Some simply provide an indication or alarm upon proximity of Own and Other stations; some require active signal transmissions for determination of range; others require uplink data transmissions from ground-based equipment. All are subject, to a greater or lesser extent, to production of false alarms, or missed alarms or radio signal interference, such conditions occurring frequently under congested airspace conditions where such degradations are least tolerable. Determinations of bearings from Own to Other stations, desirable information, have heretofore been difficult to obtain; proposed airborne directional antenna systems for this purpose have proven too unreliable and costly to be practical. While North pulses can be used to determine bearings, this invention avoids the need for so-called North pulse kits to be installed on SSRs.

SUMMARY OF THE INVENTION

According to this invention, techniques disclosed in U.S. Pat. No. 4,021,802 and the patents referred to therein are used with stored data of the locations and signatures of all, or an appropriate selection, of existing SSRs to determine passively the geographical locations of an Own station and all Other transponder-equipped stations within an area of interest that is served by two or more SSRs. The needed conditions are generally met quite amply wherever there is enough air traffic to create a need for collision avoidance systems.

DESCRIPTION OF EXEMPLARY EMBODIMENTS

Figure 1:
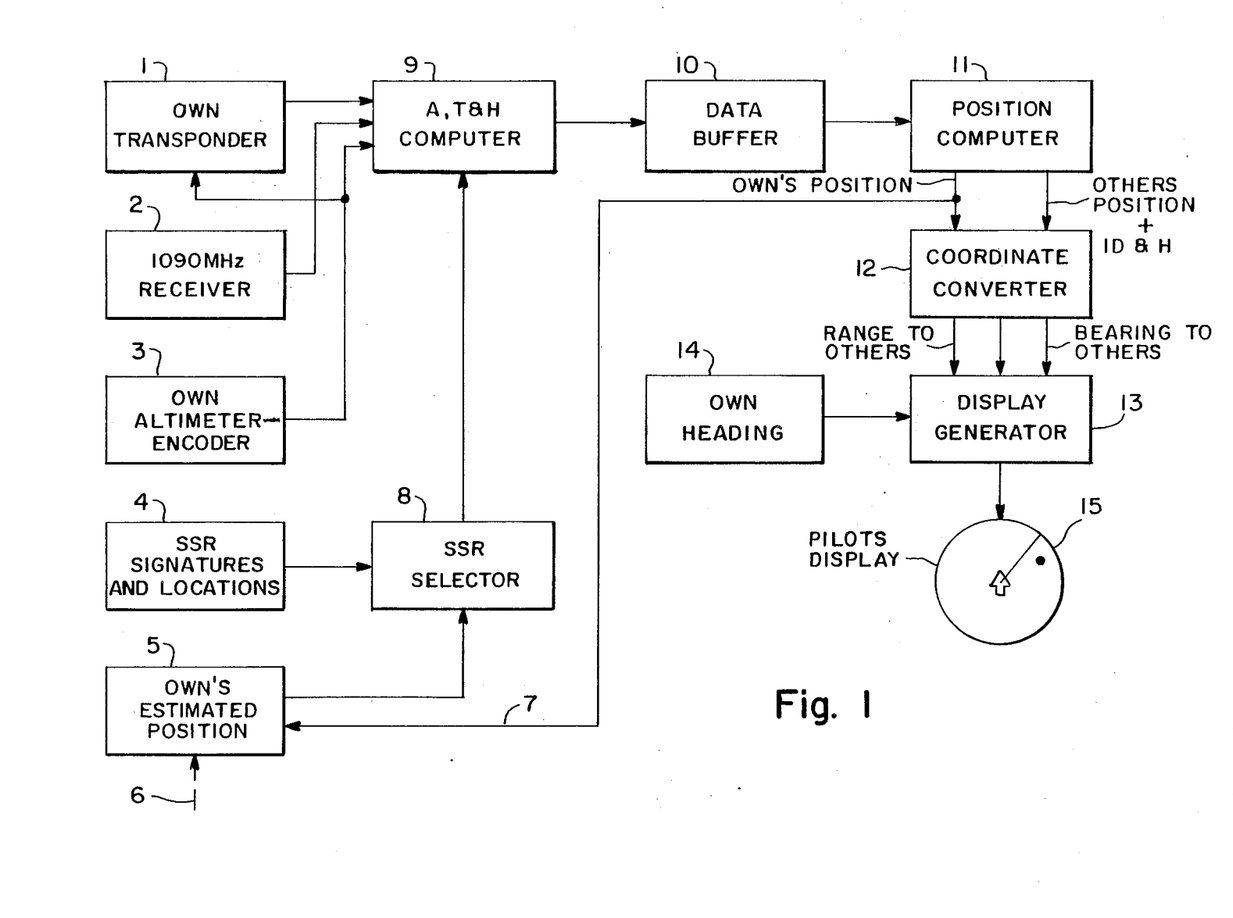
FIG. 1 is a block diagram of a preferred embodiment of the invention.

Referring to FIG. 1, the equipment at an Own station, typically aboard an aircraft or other vehicle, includes a standard ATCRBS transponder 1 adapted to receive conventional SSR interrogations at 1030 MHz and to reply thereto at 1090 MHz. It is arranged to provide an output pulse upon receiving each interrogation, in a predetermined time relationship to the received interrogation. A 1090 MHz receiver 2 is adapted to receive the reply signals of any Other transponders within its range, providing pulse outputs corresponding to such replies. An altimeter and encoder 3 is connected to transponder 1 for including Own's altitude in its replies.

A storage device 4, preferably a non-evanescent register such as a read-only memory (ROM) contains an organized listing of all SSRs that might be used with the system, including the signature and geographical location of each. The signature of an SSR is the distinctive combination of main beam rotation period (P) and pulse repetition characteristic (PRC) assigned to that particular SSR. The term "characteristic" is used to account for the fact some SSRs are assigned fixed pulse repetition periods, and others are assigned so-called "staggered" pulse repetition periods, wherein the time between successive interrogations varies in a predetermined sequence. For example, an eight-step staggered PRP is repeated continuously, allowing two or more complete sequences to be received during rotational passage of a radar main beam. Since there are only a few thousand SSRs presently installed throughout the world, it is readily feasible to store the locations and characteristics of all such radars in the device 4 if desired.

A storage device 5 is adapted to contain data defining Own's estimated position, which can be entered manually or by other external means such as Loran C equipment, as indicated by the arrow 6. The device 5 is designed to retain the most recently entered data, perhaps when the system is turned off, and to replace said data with revised or updated data when supplied on line 7.

The current Own's estimated position data is supplied to an SSR selector 8, which includes data comparator means arranged in known manner to select, on the basis of their positions as stored in device 4 and Own's estimated position, all SSRs within say 100 miles of Own's position. The selection window may be adjustable, and may be designed to select up to, for example, five of the most favorably located radars. The signatures and locations of the selected radars are supplied to A, T and H computer 9.

The interrogation-related pulses from the receiver of Own's transponder 1, the Other's replies from receiver 2, and encoded Own's altitude from altimeter-encoder 3 are also applied as inputs to computer 9, which may be essentially the same as shown and described in U.S. Pat. No. 4,021,802, with reference to the upper three-quarters of FIG. 3 thereof, specifically the elements designated therein by the reference numerals 301-304 and 306-319. The PRC selectors, corresponding to elements 301 and 304 of said patent, are adjusted by the SSR selector 8 to accept the interrogations of the detected SSRs and the replies elicited thereby.

The computer 9 operates in the manner described in said U.S. Pat. No. 4,021,802 to produce output data representing the differential time of arrival T, the differential azimuth A, and H, the differential altitude, of each Other station with respect to Own, in association with the respective identity of the Other, and the identity or signature of the SSR from which it was obtained. Such data will usually appear serially in separate bursts, in a sequence that depends on the positions of the participating stations and the rotation periods of the SSRs.

The data from computer 9 is stored as it becomes available in a buffer device 10, which comprises a group of registers, each arranged to store associatively the A, T and H data relating to an identified Other station, with said Other's identity and the location of the SSR from which the data was obtained. As each such set of data is completed, the buffer 10 presents it to a position computer 11. When the computer 11 has completed any currently ongoing calculation and is free to do so, it accepts the presented data set and releases the respective buffer register for accumulation of another set.

The computer 11 may be a small general purpose computer or a dedicated device, programmed to calculate Own's and Other's geographical positions. One type of program that has been used successfully for this purpose is based on the "Simplex" algorithm, as described beginning on page 340 of the May 1984 issue of BYTE, a periodical published by McGraw-Hill Inc.

The computer 11 provides outputs representing the positions of Own and an identified Other station in response to each data set. Usually it will complete the required calculation before a subsequent data set becomes available. If the calculation requires more time, as when the initial estimate of Own's position is widely erroneous, the data is retained in the buffer until the position computer is ready to accept it.

The Own's and Other's positional data, which may be in latitude-longitude format, for example, with Other's data tagged with its identity code, are applied to a coordinate converter 12 of known type. The converter produces outputs representing range and bearing of the identified Other from Own. A display generator 13, also of known type, uses said outputs to produce signals for controlling a display device 15 such as a cathode ray tube to exhibit Other's range, bearing and identity code. Own's heading, obtained from a device 14 such as a compass, may also be applied to the generator 13 to orient the display with respect to Own's heading.

Figure 2:
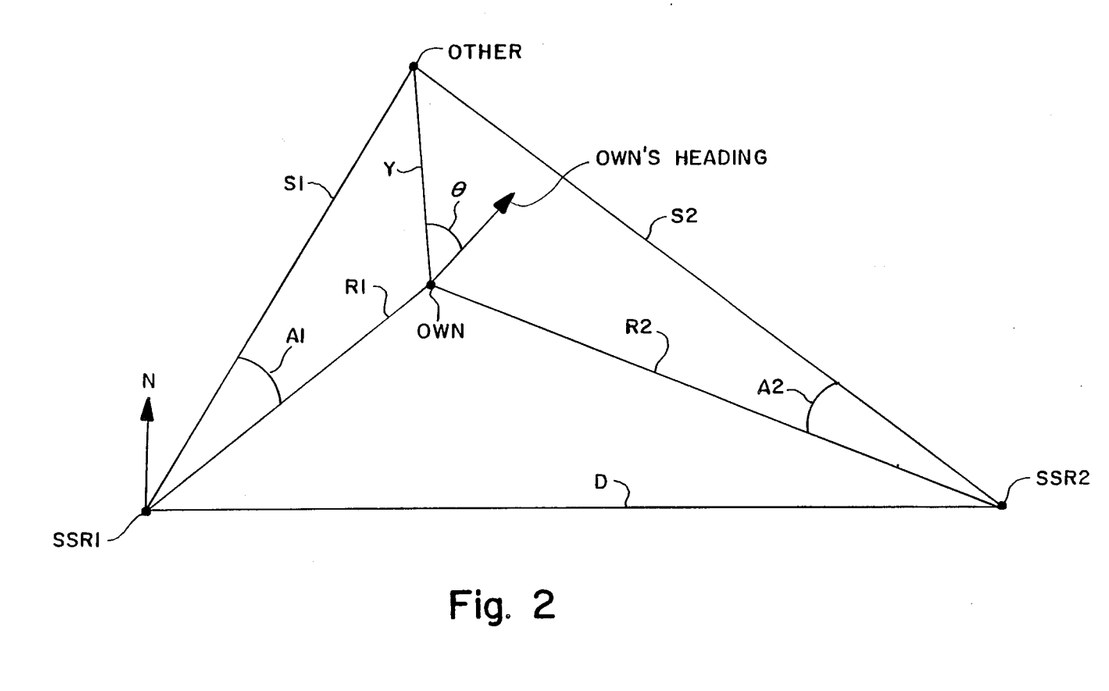
FIG. 2 is a geometric diagram used in explaining the operation of the system of FIG. 1.

FIG. 2 is a plan or map-like representation of the known positions of two radars SSR 1 and SSR 2 and the (initially unknown) positions of Own and an Other station. The differential azimuths A1 and A2 between Own and Other with respect to SSR 1 and SSR 2 are determined by computer 9, as are also the differential times of arrival T1 and T2 at Own and Other, from SSR 1 and SSR 2, respectively. The length and direction of the line D between the radars is known or directly obtainable from the known positions of the radars. R1 and R2 are the lines of position of Own from SSR 1 and SSR 2, and S1 and S2 are those of Other from said radars.

Assuming Own to be at some estimated position, which usually will not be coincident with Own's true position, the corresponding directions and lengths of the lines of position R1 and R2 are readily determinable. From the directions and the known values of A1 and A2, the corresponding directions of the lines S1 and S2 may then be calculated. The position of Other is at the intersection of S1 and S2.

If the initially estimated position of Own were correct, T1 would be $$1/c(S1+Y-R1)$$

after accounting for systemic delays in the transponders, where c is the velocity of radio wave propagation. T2 would be $$1/c(S2+Y-R2).$$

These calculated values of T1 and T2 are compared with the actual values as provided by computer 9. If they agree, the assumption was correct, and the true positions of Own and Other have been determined. If they do not agree, the assumption was incorrect and a new one must be made and the operation repeated.

A recursive algorithm such as the above mentioned Simplex provides an improved estimate of Own's position with each iteration, converging to one as close as desired to the true position. Once Own's position is established by the above algorithm, then a different known algorithm such as Kalman filtering may be used to update Own's and Other's positions based on the subsequent data. The number of iterations required depends on the degree of accuracy desired, and may be quite small if the original estimate is reasonably close. Although the operation has been described in an environment of two SSRs and one Other station, it is the same with more than two SSRs and essentially any number of Others, since it requires no radio transmissions other than those already in use by the existing air traffic control system. The approximations improve with the number of participants.

The computer 11 may be arranged to use the same algorithm by estimating the location of an Other station as the starting point. This mode would be advantageous for example when an Other station is placed at a fixed known location, as on a tower or a mountain top. Then the initial estimate would be correct, and Own's location could be determined immediately, without successive approximations. The positions of any additional Other stations in the area could then subsequently be determined using Own's determined position as its estimated position.

We claim:

1. Apparatus for determining the positions of an Own station and an Other transponder-equipped station within the overlapping service area of two or more SSRs at known locations, including at the Own station:
   a. means for receiving the interrogations transmitted by said SSRs,
   b. means for identifying said SSRs based on their pulse repetition characteristics, and beam rotation periods,
   c. means for storing and retrieving the geographical locations of said identified SSRs,
   d. means for receiving replies transmitted from said Other station in response to said interrogations,
   e. means for identifying said Other station from its replies,
   f. means for identifying the SSR eliciting each such reply from the pulse repetition characteristic thereof,
   g. means for determining from the time relationships between said received interrogations and replies data defining the position of said Other station with respect to the Own station in coordinates of differential azimuth (A) and differential time of arrival (T), and
   h. means for computing, from said data and the known positions of said SSRs, the positions of said Own and Other stations.

2. The apparatus of claim 1, wherein said means h includes
   i. means for accepting an initial estimate of the position of one of said Own and Other stations,
   j. means for computing, from said estimate and said data regarding one of said coordinates and the positions of said SSRs, an estimate of the position of the other of said Own and Other stations,
   k. means for computing from said latter estimate data regarding the other of said coordinates of said estimated position of said other station, and
   l. means for comparing said last mentioned computed data with the actual data regarding said other coordinate to correct said first initial estimate of position.

3. The apparatus of claim 2, wherein said first initial estimate of position is that of said Own station.

4. The apparatus of claim 2, wherein said first initial estimate of position is that of said Other station.

5. The apparatus of claim 2, wherein said one coordinate is differential azimuth (A) and said other coordinate is differential time of arrival (T).

6. The apparatus of claim 1, further including means for displaying the positions of said stations.

7. The apparatus of claim 1, further including means for displaying the range and bearing of said Other station from said Own station.

8. A method of determining the positions of an Own station and an Other transponder-equipped station within the overlapping service area of two or more SSRs at known locations, including the steps of
   a. receiving at the Own station the interrogations transmitted by said SSRs,
   b. Identifying said SSRs from their pulse repetition characteristics and beam rotation periods,
   c. retrieving stored geographical locations of said SSRs,
   d. receiving at the Own station the replies transmitted from said Other station in response to said interrogations,
   e. identifying said Other station from its replies,
   f. identifying the SSR eliciting each such reply from the pulse repetition characteristic thereof,
   g. determining from the time relationships between said received interrogations and replies data defining the relative position of said Other station with respect to the Own station in coordinates of differential azimuth (A) and differential time of arrival (T), and
   h. computing, from said data and the known positions of said SSRs, the positions of said Own and Other stations.

9. The method of claim 8, further including the steps of
   i. providing an initial estimate of the position of one of said Own and Other stations,
   j. computing, from said estimate and said data regarding one of said coordinates and the positions of said SSRs, an estimate of the position of the other of said Own and Other stations,
   k. computing from said latter estimate data regarding the other of said coordinates of said estimated position of said other station, and
   l. comparing said last mentioned computed data with the actual data regarding said other coordinate to correct said first initial estimate of position.

10. The method of claim 9, wherein said first initial estimate of position is that of said Own station.

11. The method of claim 9, wherein said first initial estimate of position is that of said Other station.

12. The method of claim 9, wherein said one coordinate is differential azimuth (A) and said other coordinate is differential time of arrival (T).

13. The method of claim 8, further including the steps of displaying the positions of said stations.

14. The method of claim 8, further including the steps of displaying the range and bearing of said Other station from said Own station.

* * * * *

UNITED STATES PATENT AND TRADEMARK OFFICE
CERTIFICATE OF CORRECTION

PATENT NO. : 4,768,036

DATED : Aug. 30, 1988

INVENTOR(S) : George B. Litchford and Burton L. Hulland

It is certified that error appears in the above-identified patent and that said Letters Patent is hereby corrected as shown below:

On the Title Page, "14 Claims, 2 Drawing Sheets" should read
--18 Claims, 2 Drawing Sheets--.

In the Claims:

Cancel claims 1-14 and substitute the following claims therefor:

--1. Apparatus for determining the positions of an Own station and an Other transponder-equipped station within the overlapping service area of two or more SSRs at known locations, including at the Own station;

a. means for receiving the interrogations transmitted by said SSRs,     b. means for identifying said SSRs,     c. means for storing and retrieving the geographical locations of said identified SSRs,     d. means for receiving replies transmitted from said Other station in response to said interrogations,

UNITED STATES PATENT AND TRADEMARK OFFICE
CERTIFICATE OF CORRECTION

PATENT NO. : 4,768,036

DATED : Aug. 30, 1988

INVENTOR(S) : George B. Litchford and Burton L. Hulland

It is certified that error appears in the above-identified patent and that said Letters Patent is hereby corrected as shown below:

e. means for identifying said Other station from its replies, f. means for identifying the SSR eliciting each such reply from the pulse repetition characteristic thereof,   g. means for determining from the time relationships between said received interrogations and replies data defining the position of said Other station with respect to the Own station in coordinates of differential azimuth (A) and differential time of arrival (T), and   h. means for computing, from said data and the known positions of said SSRs, the positions of said Own and Other stations.--;

--2. The apparatus of claim 1, wherein said means h includes i. means for accepting an initial estimate of the position of one of said Own and Other stations,

UNITED STATES PATENT AND TRADEMARK OFFICE
CERTIFICATE OF CORRECTION

PATENT NO. : 4,768,036
DATED : Aug. 30, 1988
INVENTOR(S) : George B. Litchford and Burton L. Hulland It is certified that error appears in the above-identified patent and that said Letters Patent is hereby corrected as shown below:

j. means for computing, from said estimate and said data regarding one of said coordinates and the positions of said SSRs, an estimate of the position of the other of said Own and Other stations, k. means for computing from said latter estimate data regarding the other of said coordinates of said estimated position of said other station, and l. means for comparing said last mentioned computed data with the actual data regarding said other coordinate to correct said first initial estimate of position.--;

--3. The apparatus of claim 2, wherein said first initial estimate of position is that of said Own station.--;

--4. The apparatus of claim 2, wherein said first initial estimate of position is that of said Other station.--;

--5. The apparatus of claim 2, wherein said one coordinate is differential azimuth (A) and said other coordinate is differential time of arrival (T).--;

UNITED STATES PATENT AND TRADEMARK OFFICE
CERTIFICATE OF CORRECTION

PATENT NO. : 4,768,036

DATED : Aug. 30, 1988

INVENTOR(S) : George B. Litchford and Burton L. Hulland

It is certified that error appears in the above-identified patent and that said Letters Patent is hereby corrected as shown below:

-- 6. The apparatus of claim 1, further including means for displaying the positions of said stations. --;

-- 7. The apparatus of claim 1, further including means for displaying the range and bearing of said Other station from said Own station. --;

-- 8. The apparatus of any one of claims 1-7, wherein said means for identifying said SSRs is based on their pulse repetition characteristics. --;

-- 9. The apparatus of any one of claims 1-7, wherein said means for identifying said SSRs is based on the pulse repetition characteristics and beam rotation periods. --;

UNITED STATES PATENT AND TRADEMARK OFFICE
CERTIFICATE OF CORRECTION

PATENT NO. : 4,768,036

DATED : Aug. 30, 1988

INVENTOR(S) : George B. Litchford and Burton L. Hulland

It is certified that error appears in the above-identified patent and that said Letters Patent is hereby corrected as shown below:

--10. A method of determining the positions of an Own station and an Other transponder-equipped station within the overlapping service area of two or more SSRs at known locations, including the steps of     a. receiving at the Own station the interrogations transmitted by said SSRs,     b. identifying said SSRs,     c. retrieving stored geographical locations of said SSRs,     d. receiving at the Own station the replies transmitted from said Other station in response to said interrogations,     e. identifying said Other station from its replies,     f. identifying the SSR eliciting each such reply from the pulse repetition characteristic thereof,

UNITED STATES PATENT AND TRADEMARK OFFICE
CERTIFICATE OF CORRECTION

PATENT NO. : 4,768,036

DATED : Aug. 30, 1988

INVENTOR(S) : George B. Litchford and Burton L. Hulland

It is certified that error appears in the above-identified patent and that said Letters Patent is hereby corrected as shown below:

g. determining from the time relationships between said received interrogations and replies data defining the relative position of said Other station with respect to the Own station in coordinates of differential azimuth (A) and differential time of arrival (T), and     h. computing, from said data and the known positions of said SSRs, the positions of said Own and Other stations.--;

--11. The method of claim 10, further including the steps of     i. providing an initial estimate of the position of one of said Own and Other stations,     j. computing, from said estimate and said data regarding one of said coordinates and the positions of said SSRs, an estimate of the position of the other of said Own and Other stations,

UNITED STATES PATENT AND TRADEMARK OFFICE
CERTIFICATE OF CORRECTION

PATENT NO. : 4,768,036

DATED : Aug. 30, 1988

INVENTOR(S) : George B. Litchford and Burton L. Hulland

It is certified that error appears in the above-identified patent and that said Letters Patent is hereby corrected as shown below:

k. computing from said latter estimate data regarding the other of said coordinates of said estimated position of said other station, and l. comparing said last mentioned computed data with the actual data regarding said other coordinate to correct said first initial estimate of position.--;

--12. The method of claim 11, wherein said first initial estimate of position is that of said Own station.--;

--13. The method claim 11, wherein said first initial estimate of position is that of said Other station.--;

--14. The method of claim 11, wherein said one coordinate is differential azimuth (A) and said other coordinate is differential time of arrival (T).--;

--15. The method of claim 10, further including the steps of displaying the positions of said stations.--;

UNITED STATES PATENT AND TRADEMARK OFFICE
CERTIFICATE OF CORRECTION

PATENT NO. : 4,768,036

DATED : Aug. 30, 1988

INVENTOR(S) : George B. Litchford and Burton L. Hulland

It is certified that error appears in the above-identified patent and that said Letters Patent is hereby corrected as shown below:

--16. The method of claim 10, further including the steps of displaying the range and bearing of said Other station from said Own station.--;

--17. The method of any one of claims 10-16, wherein the SSRs are identified from their pulse repetition characteristics.--;

--18. The method of any one of claims 10-16, wherein the SSRs are identified from their pulse repetition characteristics and beam rotation periods.--.

Signed and Sealed this

Fourth Day of July, 1989

Attest:

DONALD J. QUIGG

*Attesting Officer*   *Commissioner of Patents and Trademarks*